United States Patent [19]

Cheng et al.

[11] 4,315,901
[45] Feb. 16, 1982

[54] PROCESS FOR PRODUCING CARBON BLACK

[75] Inventors: Paul J. Cheng; King L. Mills, both of Bartlesville, Okla.

[73] Assignee: Phillips Petroleum Company, Bartlesville, Okla.

[21] Appl. No.: 171,923

[22] Filed: Jul. 24, 1980

[51] Int. Cl.$^3$ .................... C01B 31/02; C09C 1/48
[52] U.S. Cl. ........................ 423/455; 423/450; 423/449
[58] Field of Search ............ 423/445, 449, 450, 455, 423/456; 422/150

[56] References Cited

U.S. PATENT DOCUMENTS

| | | | |
|---|---|---|---|
| 2,865,717 | 12/1958 | Krejci | 23/209.4 |
| 3,362,790 | 1/1968 | Wood et al. | 23/259.5 |
| 3,490,869 | 1/1970 | Heller | 23/209.4 |
| 3,915,653 | 10/1975 | Cheng | 23/259.5 |
| 3,922,335 | 11/1975 | Jordan et al. | 423/450 X |
| 4,071,496 | 1/1978 | Krauss et al. | 423/450 X |
| 4,085,197 | 4/1978 | Cheng | 423/450 |
| 4,134,966 | 1/1979 | Austin | 423/456 |
| 4,224,284 | 8/1980 | Cheng | 422/156 |

*Primary Examiner*—O. R. Vertiz
*Assistant Examiner*—Gregory A. Heller

[57] ABSTRACT

Carbon black having a tint residual of less than about −5 is produced by injecting a feedstock axially into a vortex flow, oil furnace carbon black reactor having a cylindrical precombustion zone and a frustoconical converging zone.

14 Claims, 2 Drawing Figures

PROCESS FOR PRODUCING CARBON BLACK

BACKGROUND OF THE INVENTION

The present invention relates to an apparatus suitable for carrying out the production of carbon black. In another aspect, the invention relates to a process for the production of carbon black.

At the present time, the principal use for carbon black is as a reinforcing agent for rubber. Large amounts are utilized in the manufacture of vehicular tires. Carbon black strengthens tires into which it has been compounded, thus lessening the probability of untimely tire failure. Additionally, the incorporation of carbon black into vehicular tires and other rubber goods increases their useful life.

Carbon blacks which impart improved properties to rubber goods, particularly greater strength and longer life, are much sought after. It has recently been found that carbon blacks produced in vortex flow, oil furnace reactors which have a wide distribution in aggregate particle sizes impart improved resilience, lower hysteresis and better wire cord adhesion to rubber into which it has been compounded than conventional blacks, which have a narrower distribution in aggregate particle sizes.

Tint residual, which is a calculated property of carbon black made by a vortex flow, oil furnace process, is reflective of the distribution of the aggregate sizes in a carbon black sample, as compared to the average distribution and aggregate sizes of blacks commercially available from Phillips Petroleum Company and others manufacturing carbon black by vortex flow, oil furnace type processes. Tint residual is the difference between the tint observed during testing of carbon black sample and the tint which would be expected from the sample because of its surface area and structure. Tint residual is given by the equation:

$$TR = T - [56.0 + 1.057(CTAB) - 0.002745(CTAB)^2 - 0.2596[C\text{-}DBP] - 0.201(N_2SA - CTAB)]$$

In this formula the abbreviations used have the following meanings and the properties are measured as described:

TR: Tint residual

CTAB: The specific surface area of the carbon black sample measured as described in ASTM D 3765-79, meter$^2$/gm.

$N_2SA$: The surface area of the carbon black sample measured using nitrogen in accordance with the ASTM method D-3037-76, meter$^2$/gm.

C-DBP: The structure of the compressed carbon black sample measured as described in ASTM D 3493-76, cc/100 grams.

T: The tint or tinting strength of the carbon black sample measured in accordance with ASTM 3265-76, assigning reference black IRB No. 4 the value of 100.

A carbon black sample which is characterized by a negative tint residual has a relatively broad distribution in aggregate sizes while a carbon black sample characterized by a positive tint residual has a relatively narrow distribution of particle sizes. Normally, the tint residual exhibited by a carbon black sample will be between about −20 and +20, commercially available blacks having a tint residual between about -2 and +15, usually between about 0 and +5.

The tint exhibited by a carbon black sample is dependent upon, among other things, the size of the particles in the sample as well as on the size distribution of the particles making up the sample. Tint calculated from the CTAB, $N_2SA$, and C-DBP values obtained from a sample, as in the bracketed portion of the above equation, fails to fully account for the size distribution of the particles. The tint residual of the sample, the difference between the observed tint and calculated tint, is caused largely by the particle size distribution in the sample and thus can be employed to yield useful information.

For a carbon black characterized by a given surface area and structure, it would be highly desirable to minimize the tint exhibited by the sample, because the low tint would be indicative of a wide distribution of particle size. Conversely, for a carbon black sample exhibiting a given tint, it would be highly desirable to increase the average surface area of the particles.

Heretofore, carbon black having a broad distribution of aggregate sizes had been produced successfully only in small reactors. The reactors which had been successfully employed to produce this special kind of carbon black were extremely sensitive to changes in operating conditions, and thus tricky to operate. Additionally, the production of broad distribution particle size carbon black by a battery of small reactors would be frequently economically unattractive. A commercial reactor capable of producing carbon black having a tint residual of less than for example, −5 or −6, would be extremely desirable.

OBJECTS OF THE INVENTION

It is thus an object of the present invention to provide a carbon black reactor capable of producing carbon black having a tint residual of less than about −5 in commercial quantities.

It is a further object of this invention to provide a process for producing a carbon black having a tint residual of less than −5 in commercial quantities.

SUMMARY OF THE INVENTION

According to the present invention, a carbon black reactor is provided which comprises, in series, a generally cylindrical precombustion zone, a converging zone, a diverging zone, and an elongated generally cylindrical zone. At least one tunnel communicates generally tangentially with the cylindrical precombustion zone through its cylindrical side wall. Means for introducing a carbon black feedstock axially into the precombustion zone is provided as well as means for quenching the pyrolyzed feedstock after the reaction has taken place.

According to another embodiment of the present invention, a process is provided for the production of a carbon black having a wide distribution of aggregate sizes by introducing combustion gases generally tangentially through the side wall of a carbon black reactor having a precombustion zone with a radius of greater than about 10 inches so that the combustion gases experience a low angular acceleration. The combustion gases hug the reactor wall as a vortex and define a vortex eye longitudinally situated in the carbon black reactor which is well defined, large, and is characterized by fluid flow with a low linear velocity along the longitudinal axis of the reactor. A carbonaceous feed is introduced into the eye of the vortex and is pyrolyzed to form a particulate carbon black having a broad aggregate size distribution.

DETAILED DESCRIPTION OF THE INVENTION

Figure 1:
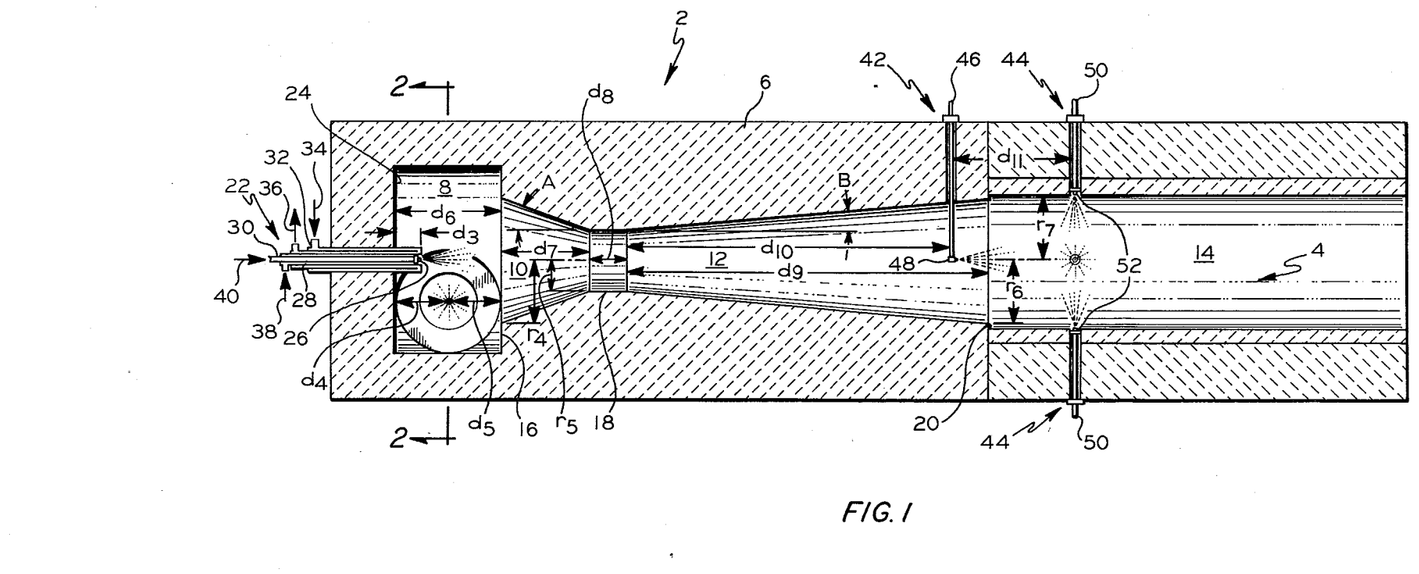
FIG. 1 is a longitudinal sectional view of a carbon black water embodying certain features of the present invention

According to the invention, a carbon black reactor, designated generally by the numeral 2, comprises a flow passage 4 disposed within a mass of refractory material 6 serving as the means for defining the flow passage. The flow passage 4 comprises, in series from upstream to downstream, a generally cylindrical precombustion zone 8 which is closed at one end by a wall 24, a converging zone 10, a diverging zone 12, and an elongated generally cylindrical zone 14. The zones communicate and are in axial alignment. The converging zone 10 and diverging zone 12 are preferably generally frustoconical in shape for ease of manufacture. Preferably, to improve the flow pattern of fluids passing through passage 4, a shoulder 16 having a generally annular shape and facing upstream is located between the precombustion zone 8 and the converging zone 10. Shoulder 16 extends from the downstream end of zone 8 to the upstream end of zone 10. It is further preferred to provide the flow passage 4 with a generally cylindrical choke zone positioned intermediate the converging zone 10 and the diverging zone 12 to reduce erosion of the choke, lengthen reactor life and preserve the intended flow pattern through passage 4. Choke zone 18 has a radius the same as the outlet of zone 10 and the inlet of zone 12. It is further preferable to provide the flow passage 4 with a shoulder 20 located intermediate the diverging zone 12 and the elongated generally cylindrical zone 14 and facing downstream, the shoulder 20 being generally annular in shape, and defining an abrupt widening of the flow passage between the diverging zone 12 and the elongated generally cylindrical zone 14, to further improve the flow pattern and reduce pressure drop through the flow passage 4. Thus, the radius of zone 14 is preferably at least as large as the outlet of zone 12.

A means 22 for introducing a carbon black feedstock from an axial position into the flow passage 4 is provided through the end wall 24 of the precombustion zone 8. Preferably, the means 22 is positioned so as to introduce the carbon black feedstock axially along the longitudinal axis of the reactor. As illustrated, the means 22 comprises an oil nozzle 26 located in nozzle cooling air passageway 28. The air passageway 28 is defined by the space between an oil feed tube 30 and a water jacket 32. The air passageway 28 communicates with the precombustion zone 8 around nozzle 26. Fluid is introduced into the water jacket 32 via line 34 and withdrawn from water jacket 32 via line 36. Air is introduced into air passageway 28 via a line 38. The arrangement shown is particularly desirable because of its high heat resistance and long life. The carbonaceous feedstock is introduced into oil tube 30 via line 40. Oil from line 40 is usually at an elevated temperature. Means 22 is movably mounted through end wall 24 so that its position relative to end wall 24 can be adjusted, as is well known by those skilled in the art. A nozzle which has been employed with good results is a Spray System 1¼HH30150.

The flow passage 4 is equipped with a means 44 downstream of zone 10 to quench the reactor effluent. Preferably, to aid in controlling effluent temperatures from the reactor 2, the flow passage 4 is further equipped with a means 42 located upstream of the means 44 to prequench the reactor effluent. As illustrated, prequench means 42 comprises a quench fluid tube 46 radially disposed from the longitudinal axis of the reactor and emptying into the flow passage 4 through a nozzle 48 aligned along the longitudinal axis of the reactor. As illustrated, the prequench fluid is introduced into the flow passage 4 in the diverging zone 12 concurrent with the flow of reactor effluent, although it can be rotated to introduce the prequench fluid in an upstream direction, and/or located in the cylindrical zone 14 if desired. Quench means 44 each comprise a quench fluid tube 50 which conveys quench fluid to be introduced into the flow passage 4 via nozzles 52. As illustrated, nozzles 52 are oriented so as to direct quench fluid into the flow passage 4 radially, toward the longitudinal axis of the reactor. Preferably, four quench nozzles 52 are employed, two pairs of opposed nozzles perpendicularly oriented with respect to each other and arranged about a common point, to insure a uniform cooling of the reactor effluent. Any suitable quench fluid can be employed, for example, water, steam, and cooled combustion gases.

Figure 2:
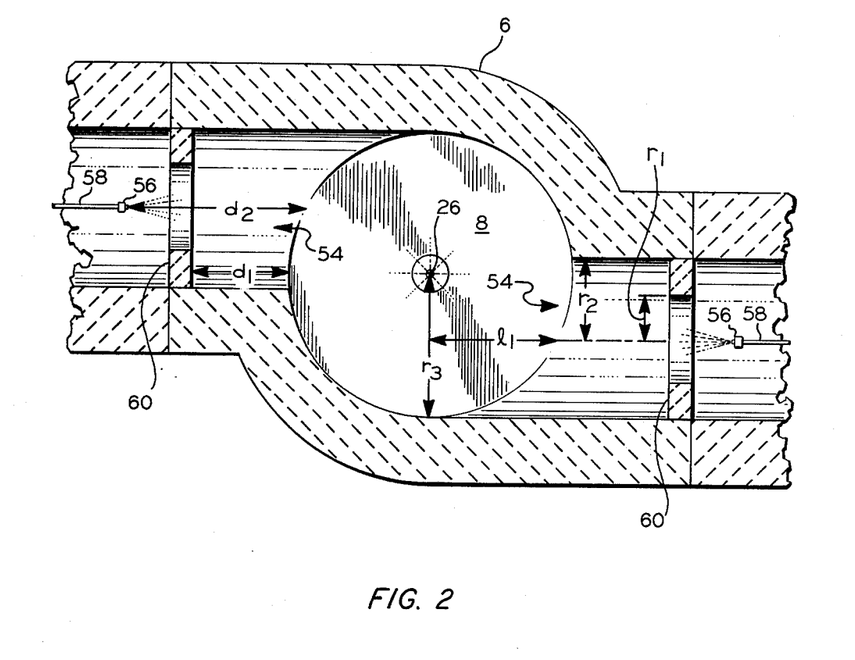
FIG. 2 is a cross sectional view of the apparatus of FIG. 1 taken along the indicated lines.

Referring now to FIG. 2, the reactor 2 further comprises a means establishing a vortex flow of combustion gases in zone 8. As shown, at least one generally tangential combustion tunnel 54 opens up into zone 8 through the refractory mass 6 defining the flow passage 4. As illustrated, a pair of opposed generally tangential cylindrical tunnels 54 open into zone 8 in a co-rotational direction, to establish a mass of combustion gases spinning about longitudinal axis of the reactor 2. The combustion gases flow in a spiral the outside radius of which is determined by the radius of the precombustion zone 8. A combustible fluid is introduced into the tunnel 54 via a nozzle 56 which is fed by a line 58. The fluid introduced into the tunnel 54 via nozzle 56 is admixed with an oxygen-containing fuel combustion supporting gas flowing through the tunnels toward the reactor flow passage 4 from a gas blower not shown. Usually, this gas is air at a temperature of between about 0° F. and 1200° F. Preferably, the nozzle 56 is located sufficiently upstream from the opening of tunnel 54 into zone 8 so that the fluid fuel introduced into the tunnel 54 is completely combusted before reaching zone 8. To aid in combustion, a choke restriction 60 is preferably disposed within the tunnel 54 to provide a minimum radius in the tunnel and cause turbulence of the fluids to be tangentially introduced. The choke 60 comprises a simple restrictor ring cast of suitable refractory material and mounted in the tunnel 54 downstream of nozzle 56 with its longitudinal axis coinciding with the longitudinal axis of the tunnel.

Construction of the reactor hereinbefore described is facilitated by casting the refractory material in sections as is well known by those skilled in the art.

Suitable ranges of reactor dimensions, with reference to the figures, is given by Table I below. The dimensions of a reactor as described in U.S. Pat. No. 4,071,496 are supplied for comparison.

TABLE I

REACTOR DIMENSIONS
(inches)

| Feature | Col. 1 Generally | Col. 2 Preferably | Col. 3 More Preferably | Col. 4 U.S. 4,071,496 |
|---|---|---|---|---|
| radius of tunnel choke 60 passage ($r_1$) | 3-10 | 4-8 | 6 | 0.5[a] |
| radius of tunnel 54 passage ($r_2$) | 6-16 | 8-14 | 11 | 2 |
| radius of precombustion zone 8 ($r_3$) | 15-27 | 18-24 | 19.5 | 5 |
| radius of converging zone 10 inlet ($r_4$) | 8-17 | 10-15 | 13 | 1.5 |
| radius of converging zone 10 outlet ($r_5$) | 4-8 | 5-7 | 6.5 | 0.8 |
| radius of diverging zone 12 outlet ($r_6$) | 10-19 | 12-17 | 14 | 1.5 |
| radius of elongated cylindrical zone 14 ($r_7$) | 10-19 | 12-17 | 14 | 1.5 |
| Distance of tunnel choke 60 from precombustion zone 8 ($d_1$) | 14-28 | 17-25 | 22 | 15.8[a] |
| distance of fuel nozzle 56 from precombustion zone 8 ($d_2$) | 15-32 | 19-28 | 25 | 7.8 |
| distance of feed nozzle 26 from upstream end wall 3 ($d_3$) | 0-25 | 0-20 | 0-14 | 0.2 |
| distance of tunnel 54 axis from upstream end wall 3 ($d_4$) | 7-14 | 9-14 | 11 | 2 |
| distance of tunnel 54 axis from converging zone 10 inlet ($d_5$) | 7-14 | 9-14 | 11 | 2 |
| length of precombustion zone 8 ($d_6$) | 14-32 | 18-28 | 22 | 4 |
| length of converging zone 10 ($d_7$) | 10-25 | 15-20 | 18 | 3.29 |
| length of flow passage choke 18 ($d_8$) | 4-13 | 6-11 | 8 | 0.5 |
| length of diverging zone 12 ($d_9$) | 60-110 | 75-95 | 85 | 3.29 |
| distance of prequench 42 from diverging zone 12 inlet ($d_{10}$) | 40-100 | 60-80 | 67 | variable |
| distance of quench 44 from prequench 42 ($d_{11}$) | 15-35 | 20-30 | 25 | ~52 |
| converging zone 10 half-angle A degrees | 10-30 | 15-25 | 20 | 12 |
| diverging zone 12 half-angle B degrees | 2-9 | 4-7 | 5 | 12 |
| perpendicular intersection of tunnel 54 axis with $r_3$ ($l_i$) | 13-24 | 16-21 | 17.5 | 4.2 |
| $r_3^2/r_4^2$ | 1-3.6 | 2-2.5 | 2.25 | 11.11 |
| $nr_1^2/r_3^2$ where n is the number of tunnels | 0.1-0.3 | 0.15-0.25 | 0.19 | 0.02[a] |
| $nr_1^2/r_5^2$ where n is the number of tunnels | 1-2.5 | 1.5-2 | 1.7 | 0.78 |
| $r_3^2/r_5^2$ | 4-20 | 7-14 | 9 | 39 |

(a) a metal choke was employed at a position recessed from the fuel nozzle.

It is believed that the dimensions and relative dimensions of the tangential tunnels, the precombustion zone, and the converging zone are especially important features of the above-described apparatus. It will be appreciated by those skilled in the art that the squared terms in the above table are representative of cross-sectional areas.

In the past, the production of negative tint residual carbon black was achieved only by employing a very small reactor operated with the oil nozzle location at or very close to the end wall of the reactor, (i.e., a $d_3$ of close to 0). It has been found, surprisingly, that the above-described reactor configuration is stable for the production of negative tint residual carbon black relatively independently of oil nozzle position, especially when operated in the hereinafter described conditions. Generally speaking, the reactor is operated according to the invention at flow rates of from about 30 to about 70 percent of its design rate, which is determined primarily by the radius $r_5$ at the converging zone outlet. The combustion gas design rate of the reactor can be approximated by the relationship:

combustion gas rate (SCF/hr,STP) = $11,900 r^{2.3}$ where r is the radius of the reactor throat in inches, ($r_5$ in FIG. 1). The relationship appears to be a good approximation at least through the ranges of reactor throat radii of from about 1.5 to about 8 inches, especially where natural gas is being combusted with about 50% excess air. It is believed that especially good results can be achieved by operating the reactor at combustion gas rates of between about 50 and about 60 percent of its combustion gas design rate. The combustion gas rate is calculated by adding the S.T.P. rates at which air and natural gas are introduced into the combustion tunnels. Similarly, according to the present invention, the reactor is operated at an oil feed rate of from about 30 to about 70 percent of its design rate.

It is interesting to note that the relationship between optimal combustion gas rate and throat diameter or area is non-linear. Reactors with larger throats require a disproportionally larger amount of combustion gases to produce maximum amounts of carbon black having the desired particle size. Although not wishing or intending to be bound by any particular theory of operation, it is believed that introducing the combustion gases at a relatively low rate aids in the creation of a well-defined core or eye in the center of the vortex spinning close to the walls of the precombustion zone and converging zone, the fluids in the eye having a relatively nonturbulent and relatively slow linear velocity in the downstream direction. It is believed that employing a conventional rate of flow in the reactor causes the gases in the vortex eye to proceed with a higher velocity along the longitudinal axis of the reactor and with more turbulence. The gases flowing in the vortex eye are believed to flow into the eye of the vortex around the oil nozzle from the back wall of the reactor. The flow of hot combustion gases through the eye of the vortex at a relatively high linear velocity is believed to be exacerbated by the introduction into the precombustion zone of conventional volumes of combustion gases. Suitable operating parameters are shown below in Table II.

TABLE II

OPERATING CONDITIONS

| Feature | Generally | Preferably | More Preferably |
|---|---|---|---|
| Combustion gas introduction velocity (calculated value at STP), Ft/sec | 15-50 | 20-35 | 25-31 |
| Combustion gas radial acceleration (calculated value at STP, r = $r_3 - r_2$), Ft/sec$^2$ | 8,000-25,000 | 10,000-18,000 | 10,180-15,800 |
| Vol % excess air | 20-100 | 50-90 | 63-80 |
| Air/oil ratio (ft$^3$(STP)/gal) | 700-1200 | 750-900 | 800-830 |
| Fuel | Synthetic Natural gas | Natural Gas, No. 6 | Natural Gas (about |

TABLE II-continued
OPERATING CONDITIONS

| Feature | Generally | Preferably | More Preferably |
|---|---|---|---|
| | Fuel oil, Propane, Conversion oil, Hydrogen, Coal gas, Petroleum residue gas | Fuel oil, Conversion oil, Propane | 970Btu/ SCF) |
| Air temp (°C.) | 50-400 | 80-110 | 96 |
| Feed (BMCI) | 85-160 | 95-130 | 101 |
| Feed temp (°C.) | 200-350 | 250-300 | 288 |
| Spray pattern (whole angle) (degrees) | 0°-120° solid or hollow cone | 10°-60° solid cone | 30° solid cone |

In Table II, the velocity at which combustion gases are introduced into zone 8 is calculated from the standard temperature and pressure (STP, 60° F., atmosphere pressure) rates at which air and fuel are introduced into the combustion tunnels and the velocity, determinative radius of the combustion tunnel, in the illustrated reactor, $r_1$. The radial acceleration of the combustion gases is calculated from the introduction velocity and the effective radius of zone 8, which, as shown, is the radius of zone 10 less the amount by which the amount by which the tunnel axis is set in from true tangential, $r_2$ as shown. By Vol. % excess air is meant the percentage of air flowing through tunnels 54 in excess of the stoichiometric amount required to completely combust the fuel introduced into the combustion tunnels 54 via nozzles 56 to $CO_2$ and $H_2O$, the excess being expressed in Vol % of that stoichiometric requirement. For example, 1.5 stoichiometric amounts of air is 50% excess. The air/oil ratio is calculated by dividing the rate at which air is introduced at STP into tunnels 54 by the rate as measured in gallons per unit time that feedstock is introduced into the reactor 2 via nozzle 26. Air temp. (°C.) is the temperature at which air is introduced into tunnels 54. Generally, the air has been preheated by indirect heat transfer with a heating medium, such as stack gases, etc. Feed (BMCI) refers to the Bureau of Mines Correlation Index of the feedstock introduced into the reactor via nozzle 26, and is a measure of aromaticity Similar to the air, the feedstock is generally preheated before introduction into the reactor, the temperature to which the feedstock is preheated being indicated in Table II as Feed temp. (°C.). Nozzle 26 generally discharges into the zone 8 as a hollow or solid cone diverging in a direction away from the end wall 24 of the reactor from the longitudinal axis, described in Table II.

The combustion gases are formed in combustion tunnel 54 by at least partially combusting the combustible fluid introduced via nozzle 56 with the oxygen-containing fuel combustion supporting gas. The combustion gases then pass into the zone 8 and form a vortex spiraling toward the zone 18. The combustion gases experience a radial acceleration as they change direction which causes a large portion of the combustion gases to hug the cylindrical sidewall of zone 8 defining a substantial eye along the axis of the vortex. The outer limits of the vortex are defined by the reactor wall, and the length of the vortex eye is influenced substantially by the longitudinal reactor dimensions. Generally, the eye is believed to extend longitudinally for the length of zone 8 and partially into zone 10. It is thus believed to have a length of between about 24 and about 48 inches.

The carbonaceous feedstock is introduced into the eye of the vortex via nozzle 26. Most of the feedstock remains in the vortex eye as a concentrated core which is swept toward zone 18 as a reaction stream surrounded by the spiraling combustion gases. As the combustion gases flow in a spiral pattern through zone 10, the radius of the spiral is reduced until the vortex disintegrates, admixing with the reaction stream. The feedstock in the reaction stream is pyrolyzed by the combustion gases to form an effluent stream containing particulate carbon black. The pyrolysis reaction is substantially completed shortly after the reacting mass has flowed through zone 18. The effluent is quenched by quench fluid introduced via means 42 and 44 to a suitable temperature, preferably after being subjected to a radial expansion in zone 12, and at least a portion of the carbon black particulate separated from the effluent stream by means, not shown, as is well known by those skilled in the art.

For a carbon black reactor as shown in the figures and described in Table I, these operating conditions can be achieved by introducing reactants into the reactor according to the following table:

TABLE III
INPUT RATES

| Item | Generally | Preferably | More Preferably |
|---|---|---|---|
| Tangential air (SCF/Hr, STP) | 300,000-800,000 | 400,000-600,000 | 437,600-550,600 |
| Tangential fuel (natural gas, SCF/Hr, STP) | 20,000-50,000 | 26,000-39,000 | 29,800-35,600 |
| Axial air (SCF/Hr, STP) | 8,000-16,000 | 10,000-14,000 | 11,600-12,900 |
| Axial feed (gas/hr) | 360-1000 | 450-760 | 530-704 |

The combustion gases are formed in the combustion tunnels by tangential fuel with tangential air in the amounts shown in Table III. The mass of combustion gases flows through the tunnels, through at least a portion of zone 8, and then through zone 10, zone 18, zone 12 and zone 14. The carbon black feedstock is introduced from an axial position into zone 8 via nozzle 26. At least a portion of the carbon black feedstock is pyrolyzed by the combustion gases to form an effluent containing particulate carbon black. The effluent is quenched to a suitable temperature by means 42 and means 44. At least a portion of the particulate carbon black is collected from the effluent by any suitable means, for example, by a bag filter.

As shown by the examples, the reactor of the present invention, when operated at the operating parameters of the present invention, has utility for the production of negative tint residual carbon black. The reactor produces the negative tint residual carbon black relatively independently of feed tube position and relatively independently of a change in air to oil ratio when employing the same feed. It is believed that the reactor, when operated at the conditions set forth, is characterized by low mixing at the time the feed is injected into the reactor. This broadens the aggregate size distribution of the nodules, lowers tint, and makes tint residual more negative. Because of the interrelationship of the radius of the precombustion zone and the air flow rate, it is preferred in the practice of the present invention that the ratio between the radius of the precombustion zone and the total amount of tangential air combusted with the fuel at STP be grater than about 20 inches/10$^6$ standard cubic feet per hour of air.

The surface area for carbon black employed in the production of treads into vehicular tires as measured by the nitrogen test, N$_2$SA is generally between about 80 and 150 meter$^2$ per gram. For the preferred reactor disclosed, the surface area of the carbon black produced can be adjusted by changing the air to oil ratio. Generally, a change in one unit of the air-oil ratio in SCF/gallon will result in a change of the surface area of the black by about 0.14 m$^2$/g as measured by N$_2$SA. The surface area of the carbon black particles being produced can also be manipulated by changing the annular surface area of the shoulder at the front end wall of the precombustion zone. Decreasing the surface area of the shoulder should result in a decrease in the surface area of the particles. Structure can be raised if necessary by employing air preheat or higher BMCI value feed oil.

The following example is provided to illustrate but not limit the present invention.

EXAMPLE

Two reactors were employed to produce carbon black under different operating conditions. Reactor dimensions were maintained constant except for feed nozzle position and axial quench location, as noted in Table IV, following. Reactor 1 was a reactor having the dimensions set forth in column 4 of Table I, Reactor 2 was an inventive reactor having the specific dimensions set forth in column 3 of Table I. Runs 1, 2 and 3 were carried out in reactor 1. Runs 4, 5, 6 and 7 were carried out in Reactor 2. Run 8 is a calculated run to show the production of a conventional carbon black in Reactor 2.

TABLE IV

| Feature | Run 1 | Run 2 | Run 3 | Run 4 | Run 5 | Run 6 | Run 7 | Run 8 |
|---|---|---|---|---|---|---|---|---|
| Reactor (1) | 1 | 1 | 1 | 2 | 2 | 2 | 2 | 2 |
| feed nozzle location |  |  |  |  |  |  |  |  |
| (a) in. from upstream end of precombustion zone | 0 | 0 | 2 | 2 | 8 | 2 | 14 | 28 |
| (b) in. from center of throat | 7.54 | 5.54 | 5.54 | 42 | 36 | 42 | 30 | 16 |
| (2) axial quench location |  |  |  |  |  |  |  |  |
| (a) in. from upstream end of precombustion zone | 25 | 40 | 38 | 194 | 139 | 115 | 194 | 242 |
| (b) in. from throat center | 17.46 | 32.46 | 30.46 | 150 | 95 | 71 | 150 | 198 |

Table V, following, sets forth the process conditions for each of runs 1–8. Flow rates, velocities, and acceleration for fluids are calculated values, as would be measured if the reactor were operating at standard temperature and pressure (60° F.), 1 atmosphere pressure), due to the practical difficulties involved in measuring actual velocities at reactor operating temperatures.

TABLE V

| FEATURE | Run 1 | Run 2 | Run 3 | Run 4 | Run 5 | Run 6 | Run 7 | Run 8 |
|---|---|---|---|---|---|---|---|---|
| Tangential tunnel |  |  |  |  |  |  |  |  |
| air temp (°F.) | 78 | 90 | 90 | 210 | 210 | 205 | 210 | 1200 |
| air rate (ft$^3$/hr, STP) | 6000 | 6000 | 6000 | 550,600 | 507,154 | 508,200 | 437,600 | 810,000 |
| fuel | C$_3$H$_8$ | C$_3$H$_8$ | C$_3$H$_8$ | CH$_4$ | CH$_4$ | CH$_4$ | CH$_4$ | CH$_4$ |
| fuel rate (ft$^3$/hr, STP) | 170.4 | 170.4 | 170.4 | 35,600 | 32,476 | 31,100 | 29,800 | 55,000 |
| air rate + fuel rate (ft$^3$/hr) | 6515.8 | 6515.8 | 6515.8 | 598,100 | 551,330 | 551,200 | 480,300 | 881,000 |
| % excess air | 54 | 54 | 54 | 51 | 60 | 67 | 51 | 50 |
| exit velocity, (ft/sec, STP) | 77.5 | 77.5 | 77.5 | 105.8 | 97.5 | 97.5 | 84.9 | 156 |
| Precombustion Zone |  |  |  |  |  |  |  |  |
| feed oil (°F.) | 280 | 290 | 282 | 535 | 555 | 560 | 550 | 550 |
| BMCI | 123 | 123 | 123 | 101 | 101 | 101 | 101 | 123 |
| rate (gal/hr) | 6.35 | 6.97 | 6.37 | 704 | 541 | 530 | 542 | 1405 |
| spray angle (°) | 90 | 90 | 90 | 30 | 30 | 30 | 30 | 30 |
| spray pattern | semisolid | semisolid | semisolid | full cone | full cone | full cone | full cone | full cone |
| axial air (ft$^3$/hr) | 175 | 175 | 175 | 11,900 | 11,700 | 11,900 | 12,900 | 16,000 |
| tangential gases |  |  |  |  |  |  |  |  |
| radial acel (ft/sec$^2$, STP) | 20,590 | 20,590 | 20,590 | 15,800 | 13,420 | 13,420 | 10,180 | 34,360 |
| downstream velocity (ft/sec, STP) | 36.9 | 36.9 | 36.9 | 45.1 | 41.5 | 41.5 | 36.2 | 66.4 |
| total air/oil (ft$^3$/gal) | 972 | 886 | 969 | 799 | 959 | 981 | 831 | 588 |
| Throat |  |  |  |  |  |  |  |  |
| linear velocity (ft/sec, STP) | 125.9 | 125.9 | 125.9 | 180.3 | 166.2 | 166.2 | 144.8 | 265.6 |

Table VI, following, sets forth some characteristics of the carbon black recovered from each of runs 1–8.

TABLE VI

| BLACK PROPERTY | Run 1 | Run 2 | Run 3 | Run 4 | Run 5 | Run 6 | Run 7 | Run 8 |
|---|---|---|---|---|---|---|---|---|
| Tint | 99.7 | 112 | 110 | 97 | 98 | 97 | 94 | 108 |
| Tint residual | −7.7 | +4.9 | +0.5 | −5 | −6.8 | −6.2 | −6 | +2 |
| CTAB (m$^2$/g) | 97 | 94 | 98 | 87 | 91 | 88 | 79 | 96 |
| Compressed DBP (cc/100 g) | 96 | 90 | 93 | 96 | 91 | 96 | 88 | 100 |
| N$_2$SA (m$^2$/g) | 99 | 97 | 96 | 87 | 96 | 86 | 79 | 97 |
| Iodine number | 97 | 96 | 96 | 84 | 101 | 83 | 83 | 96 |
| Photelometer (CHCl$_3$) | 86 | 88 | 85 | 87 | 96 | 87 | 95 | 85 |
| Yield (lbs/gal) | 4.35 | 4.69 | 4.18 | −(a) | 3.22 | 3.12 | 3.72 | 5.23 |

(a) no gas sample for yield calculation was taken.

(a) no gas sample for yield calculation was taken.

As shown by Table VI, runs 4–7, reactor 2 is stable for the production of a carbon black having a negative tint residual. A negative tint residual carbon black was also produced in the much smaller reactor employed in run 1, but not in runs 2 or 3, which were carried out under very similar process conditions. As shown by run 8, the reactor of the present invention can also be employed to produce a conventional carbon black meeting specifications for N 339 in good yield, simply by changing operating conditions, notably, by increasing substantially the feed oil and tangential combustion gas rates. Conversely, carbon blacks having a tint residual of −5 or less are produced at combustion gas rates of from 54 to 68 percent of the design rate employed to produce an N339 carbon black at a yield of over 5 lbs./gal. from an oil having a BMCI of 123, and a feed oil rate of from about 37 to about 50 percent of the design rate.

Reasonable variations and modifications which will be apparent to those skilled in the art can be made in this invention without departing from the spirit and scope thereof.

I claim:

1. In a process for producing carbon black in a vortex flow, oil furnace reactor comprising a generally cylindrical zone having a radius of between about 15 inches and about 27 inches, a generally frustoconical zone in axial alignment with and converging away from the generally cylindrical zone from an inlet to an outlet, and at least one combustion tunnel communicating generally tangentially with the generally cylindrical zone, wherein combustion gases are introduced into the generally cylindrical zone from the at least one combustion tunnel, and wherein a carbon black forming feedstock is introduced into the reactor from a position on the axis of the generally cylindrical zone for pyrolysis by the combustion gases to form carbon black, the improvement comprising
introducing the combustion gases at a rate of between about 30 and about 80 percent of a rate calculated from the relationship $11,900r^{2.3}$, wherein r is the radius in inches of the outlet of the generally frustoconical zone and the calculated rate is measured as at standard temperature and pressure based on the rates as at standard temperature and pressure at which combustible fluid and combustion supporting gases are introduced into the at least one combustion tunnel to form the combustion gases, so as to produce a carbon black having a tint residual of about −5 or less.

2. A process as in claim 1 wherein the combustible fluid is selected from the group consisting of synthetic natural gas, natural gas, fuel oil, propane, conversion oil, hydrogen, coal gas and petroleum residue gas, wherein the combustion supporting gas is air which is introduced into the combustion tunnel in an amount from about 20 to about 100% in excess of the amount necessary to completely combust the combustible fluid and wherein 700–1200 standard cubic feet of air are introduced into the at least one tunnel for each gallon or feedstock which is introduced into the generally cylindrical zone, and wherein the combustion gases are introduced into the generally cylindrical zone at a rate of between about 30 and about 70 percent of the rate calculated from the relationship $11,900r^{2.3}$.

3. A process as in claim 2 wherein the combustible fluid is selected from the group consisting of natural gas, No. 6 fuel oil, conversion oil and propane, wherein air is introduced into the combustion tunnel in an amount from about 50 to about 90 percent in excess of the amount necessary to completely combust the combustible fluid and at a temperature of between about 50° C. and about 300° C., wherein the carbonaceous feedstock is an oil characterized by a BMCI of between about 85 and about 160 and a temperature of between about 200° C. and about 350° C. and is introduced into the generally cylindrical zone as a cone shaped spray diverging at an angle of between about 0 and about 120°, wherein 750–1000 standard cubic feet of air are introduced into the at least one tunnel for each gallon of feedstock, and wherein the combustion gases are introduced into the generally cylindrical zone at a rate of between about 50 and about 60 percent of the rate calculated from the relationship $11,900r^{2.3}$.

4. A process as in claim 3 wherein the combustible fluid is natural gas, wherein air is introduced into the combustion tunnel in an amount from about 63 to about 80 percent in excess of the amount necessary to completely combust the natural gas, and wherein the feedstock is an oil characterized by BMCI of between about 95 and 130 and a temperature of between 250° and 300° C. and is introduced into the generally cylindrical zone as a solid cone-shaped spray diverging at an angle of between 10° and 60°.

5. A process as in claim 4 wherein the combustion supporting gas is air, wherein the combustible fluid is natural gas, and wherein the carbon black forming feedstock is an oil having a BMCI value of between about 85 and about 160.

6. A process as in claim 5 further comprising maintaining a ratio between the rate in standard cubic feet per hour at which air is introduced as the combination supporting gas and the rate in gallons per hour at which the carbon black forming feedstock is introduced into the reactor between about 700 and about 1200 standard cubic feet per gallon.

7. A process as in claim 6 wherein r is between about 4 inches and about 8 inches.

8. A process for producing carbon black having a tint residual 00-5 or less in a reactor characterized by
 (i) a first generally cylindrical zone having a radius of between about 15 and about 27 inches and a length of between about 14 and about 32 inches;
 (ii) a pair of tunnels emptying generally tangentially into the generally cylindrical zone in an opposed, corotational direction, each tunnel having a radius of between about 6 and 16 inches and a restriction having a radius of between about 3 and about 10 inches;
 (iii) a first generally frustoconical zone connected to, in axial alignment with, and converging away from the first generally cylindrical zone from an inlet to an outlet, the inlet of the first frustoconical zone being adjacent the first generally cylindrical zone and having a radius of between about 8 and about 27 inches, the length of the first generally frustoconical zone being between about 10 and about 25 inches;
 (iv) a second generally cylindrical zone connected to, in axial alignment with, and extending away from the outlet of the first generally frustoconical zone from an inlet to an outlet, the second generally cylindrical zone having a radius the same as the radius at the outlet of the first generally frustoconical zone, the radius of the second generally cylindrical zone being between about 4 inches and about 8 inches and the length of the second generally cylindrical zone being between about 4 and about 13 inches;

(v) a second generally frustoconical zone connected to, in axial alignment with, and diverging away from the outlet of the second generally cylindrical zone from an inlet to an outlet, the radius of the inlet of the second generally frustoconical zone being the same as the radius of the second generally cylindrical zone, the second generally frustoconical zone having an outlet with a radius of between about 10 and about 19 inches and a length of between about 60 and about 110 inches;

(vi) a third generally cylindrical zone connected to, in axial alignment with, and extending away from the outlet of the second generally frustoconical zone, the third generally cylindrical zone having a radius of between about 10 and about 19 inches;

said process comprising:

(a) flowing a mass of combustion gases through the pair of tunnels, through at least a portion of the first generally cylindrical zone, and through the first frustoconical zone, the second generally cylindrical zone, the second frustoconical zone, and the third generally cylindrical zone at a calculated rate of from about 30 to about 70 percent of the calculated rate expressed in standard cubic feet per hour given by the equation:

$$\text{rate} = 11,900 r^{2.3},$$

wherein r is the radius of the second generally cylindrical zone in inches;

(b) introducing a carbon black feedstock having a BMCI value of between about 85 and about 160 axially into the first generally cylindrical zone as a cone-shaped spray diverging toward the first generally frustoconical zone at a rate sufficient to maintain a ratio of air employed to form the mass of combustion gases to feedstock in standard cubic feet per gallon of between about 700:1 to about 1200:1;

(c) pyrolyzing at least a portion of the feedstock with the combustion gases to form an effluent containing particulate carbon black;

(d) quenching the effluent with a quenching fluid; and (e) collecting at least a portion of the particulate carbon black from the effluent.

9. A process as in claim 8 wherein the combustion gases are formed by combusting from about 20,000 to about 50,000 standard cubic feet per hour of natural gas with from about 300,000 to about 800,000 standard cubic feet per hour of air, and the feedstock is introduced into the first generally cylindrical zone at a rate of from about 360 to about 1,000 gallons per hour.

10. A process as in claim 9 wherein the combustion gases are formed by combusting from about 26,000 to about 39,000 standard cubic feet per hour of natural gas with from about 400,000 to about 600,000 standard cubic feet per hour of air, and the feedstock is introduced into the first generally cylindrical zone at a rate of from about 450 to about 760 gallons per hour.

11. A process as in claim 10 wherein the combustion gases are formed by combusting from about 29,800 to about 35,600 standard cubic feet per hour of natural gas with from about 437,600 to about 550,600 standard cubic feet per hour of air, and the feedstock is introduced into the first generally cylindrical zone at a rate of from about 530 to about 704 gallons per hour.

12. A process as in claim 8 wherein the ratio between the radius of the first generally cylindrical zone and the amount of air combusted with the fuel is greater than about 20 inches/$10^6$ standard cubic feet per hour.

13. A process as in claim 12 wherein the radius of the second generally cylindrical zone is between about 5 and about 7 inches.

14. A process as in claim 11 wherein the radius of the second generally cylindrical zone is about 6.5 inches.

* * * * *

UNITED STATES PATENT AND TRADEMARK OFFICE
CERTIFICATE OF CORRECTION

PATENT NO. : 4,315,901
DATED : February 16, 1982
INVENTOR(S) : Paul J. Cheng et al It is certified that error appears in the above-identified patent and that said Letters Patent are hereby corrected as shown below:

Column 12, claim 8, line 2, after "residual", "OO-5", should be

-- of-5 --.

Signed and Sealed this

Seventeenth Day of August 1982

[SEAL]

Attest:

Attesting Officer

GERALD J. MOSSINGHOFF

Commissioner of Patents and Trademarks